United States Patent [19]

Greig

[11] Patent Number: 4,798,401

[45] Date of Patent: Jan. 17, 1989

[54] MULTIPLE COPY NOTE PAD

[75] Inventor: Walter G. Greig, Lewiston, N.Y.

[73] Assignee: Moore Business Forms, Inc., Grand Island, N.Y.

[21] Appl. No.: 29,710

[22] Filed: Mar. 5, 1987

[51] Int. Cl.[4] .......................... B41L 1/20; B41L 1/24; B42D 9/00; B32B 7/06

[52] U.S. Cl. .................................. 282/9 R; 282/23 R; 281/42; 428/40

[58] Field of Search .................... 282/9 R, 23 R, 28 R; 281/42; 283/37, 1 R, 14, 30; 427/150, 152; 428/40, 537.5, 194, 916

[56] References Cited

U.S. PATENT DOCUMENTS

| | | | |
|---|---|---|---|
| 3,048,426 | 8/1962 | Rodriguez et al. | 282/23 R |
| 3,257,129 | 6/1966 | Malone | 282/23 R |
| 3,290,061 | 12/1966 | Glassman | 282/23 R |
| 3,324,823 | 6/1967 | Peters | 281/42 |
| 3,981,523 | 9/1976 | Maalouf | 282/28 R |
| 4,143,891 | 3/1979 | Neubauer | 428/916 |
| 4,407,524 | 10/1983 | Trautlein | 282/9 R |
| 4,500,021 | 2/1985 | Bildusas | 428/40 |
| 4,614,363 | 9/1986 | Breen | 282/9 R |

*Primary Examiner*—Frank T. Yost
*Assistant Examiner*—Paul M. Heyrana, Sr
*Attorney, Agent, or Firm*—Cushman, Darby & Cushman

[57] ABSTRACT

By combining a pad having a repositionable adhesive with a carbonless imaging system, multiple copies of a writing on the top sheet of the pad are provided. These features have application in pads for memos, inter-office correspondence, and notes. A user may select the desired set of copies by removing the required number of sheets from the pad. If a divider is provided with each pad, e.g. a cardboard or a hard insert sheet, the multiple pages are imaged before they are removed from the pad by inserting the divider into the pad after counting the appropriate number of sheets to be copied. Thus, the divider prevents copying and imaging throughout the entire pad.

19 Claims, 2 Drawing Sheets

MULTIPLE COPY NOTE PAD

BACKGROUND OF INVENTION

1. Field of the Invention

The present invention relates to note pads and the like having a repositionable adhesive on the back of each sheet.

2. Description of the Related Art

At present, note pads having a repositionable adhesive on the back of each sheet are limited to providing a single original and no copies of each writing.

U.S. Pat. No. 3,981,523 of Maalouf, No. 4,126,334 of Van Malderghem, and No. 4,199,174 of Sornberger, all assigned to Moore Business Forms, Inc., show multiple sheet forms with carbonless coatings for producing multiple copies of an original writing. However, none of them teach the use of repositionable adhesives on the back of each sheet for holding the stack of note sheets together as a pad. Moreover, none permit the forming of sets by removing a specific number of sheets from a pad.

U.S. Pat. No. 4,230,514 of Becker et al teaches a process for separating copy paper sheets into form sets employing an adhesive. U.S. Pat. No. 4,334,771 of Ryan, Jr., reveals a system where information can be duplicated onto a certain number of forms. U.S. Pat. No. 4,583,765 of Messinger discloses a self-sticking label set involving multiple transfer copying. Although these prior art arrangements show several types of multiple sheet sets which serve the purpose of enabling a user to take a set of sheets, rather than a single sheet, in order to create the same information at once on each sheet of the set, none of these arrangements adhere the sheets together by a repositional adhesive.

SUMMARY OF THE INVENTION

A note pad or the like using a repositional adhesive to adhere the sheets in the pad together uses image transfer material placed on or between the sheets so that a desired number of copies may be made at once in addition to the original writing on the top sheet.

One of the problems encountered in the prior art but overcome by the present invention is the blocking of impressions coming through onto the sheets below. There are several alternative ways by which this problem is handled in the present invention. One of the ways is simply to tear off two or more sheets. In other words, it will not matter how many sheets a selected set contains because all of them can be placed together on another surface and then the writing can be done on the top sheet. Another alternative is to insert a piece of cardboard underneath the set of selected sheets while the sheets are still attached together in the pad so that, upon wrriting a message on the top sheet, impressions are transferred to the remaining selected sheets but such impressions are blocked from further penetration through the pad. A third way is to have the cardboard built directly into the pad between various preselected sets of sheets.

These and other advantages of the present invention will be more fully understood from the following description of the drawings and the preferred embodiments.

DETAILED DESCRIPTION OF THE PREFERRED EMBODIMENTS

Figure 1:
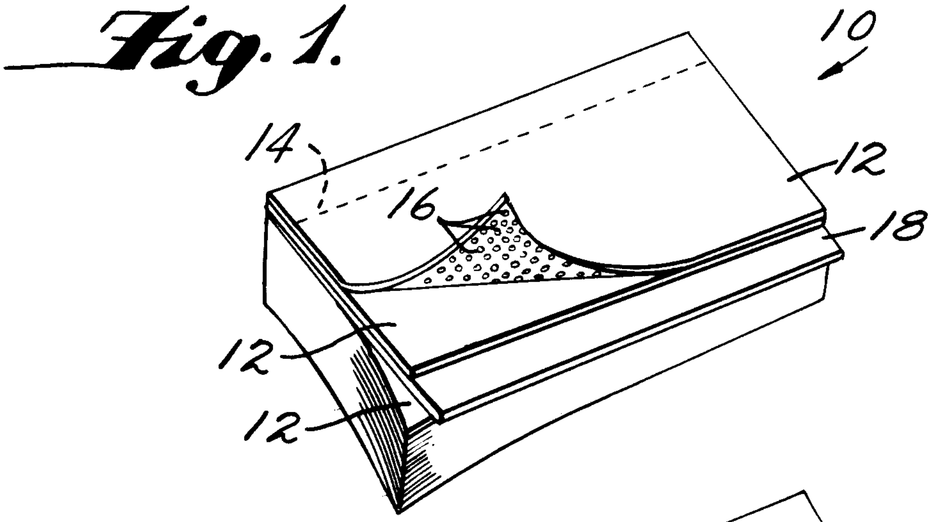
FIG. 1 shows a perspective view of a first embodiment of the note pad of the present invention.
Figure 2:
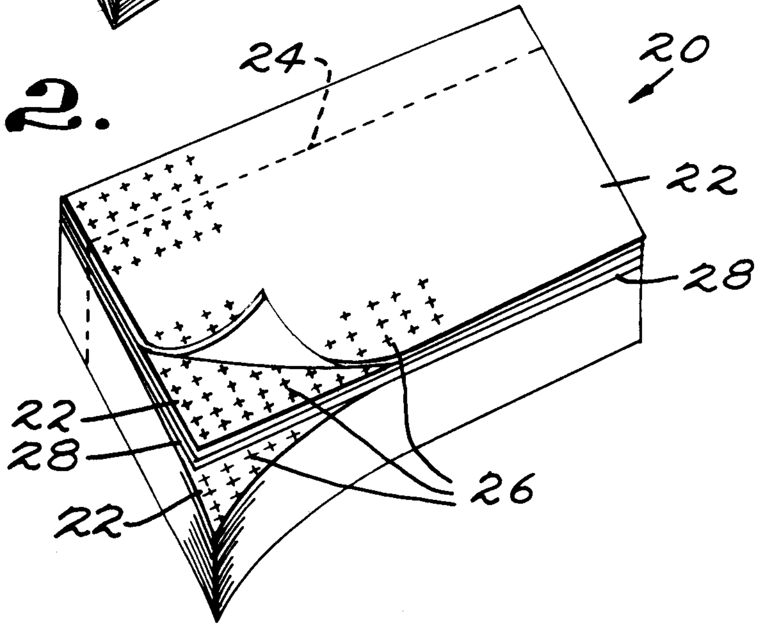
FIG. 2 shows a perspective view of a second embodiment.
Figure 3:
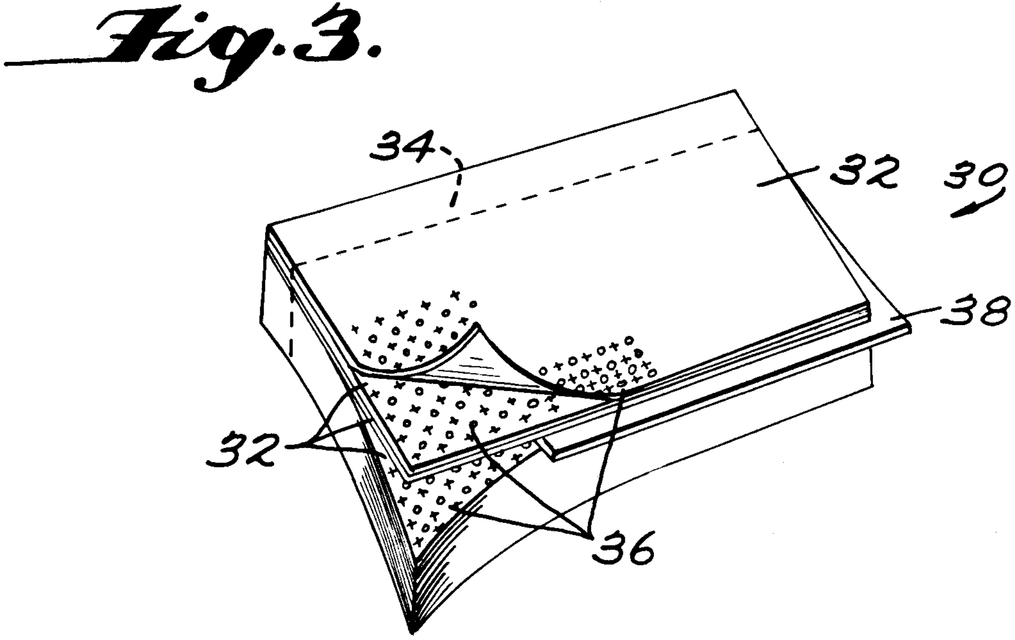
FIG. 3 shows a perspective view of a third embodiment.
Figure 4:
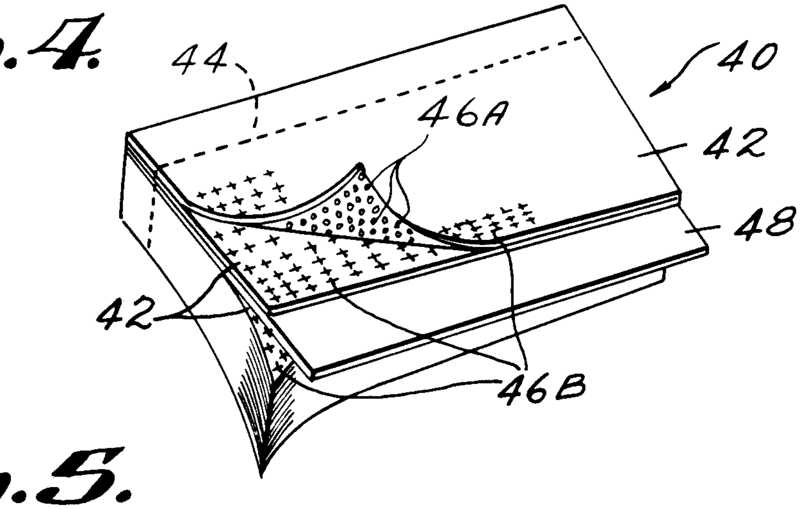
FIG. 4 shows a perspective view of a fourth embodiment.

In the four embodiments shown in FIGS. 1–4, the image transferring systems are shown to be various combinations of two different kinds of carbonless coatings. In FIGS. 1, 3, and 4, any type of carbonless coating contained in microcapsules which burst to transfer an image upon the application of pressure thereto is designated schematically by a plurality of small circles, i.e. "o", while in FIGS. 2–4, any type of resinous or clay coating which transfers an image upon the application of pressure thereto is designated schematically by a plurality of small crosses, i.e. "+".

In FIG. 1, a first embodiment of the present invention is shown to comprise a note pad 10 having a plurality of sheets 12, each of which has an underside with a top strip 14 containing a repositionable adhesive. Each underside also is covered with a layer of a carbonless image transfer material contained in a coating of microcapsules 16. A separate cardboard divider 18 is placed after a selected number of sheets 12, in this case only two, so that a writing made on a top sheet 12 may be transferred to all underlying sheets, in this case only one, but is blocked by the divider 18 from transferring the writing to any sheets underneath the divider 18.

In FIG. 2, a second embodiment is shown to comprise a note pad 20 having a plurality of sheets 22, each of which has an underside with a top strip 24 containing a repositionable adhesive. Each top side is covered with a layer of a carbonless image transfer material contained in a resinous or clay coating 26. An integral cardboard divider 28 is placed periodically after a preselected number of sheets 22, only two in this case, for the same purpose of allowing an image to be transferred to a limited number of sheets 22. Each such integral divider 28 has an underside also with a top strip 24 containing a repositionable adhesive.

In FIG. 3, a third embodiment is shown to comprise a note pad 30 having a plurality of sheets 32, each of which has an underside with a top strip 34 containing a repositionable adhesive. However, each top side is covered with a layer of mixed carbonless image transfer materials self-contained in a coating 36 made of both microcapsules and resin or clay. A separate cardboard divider 38 is placed after a selected number of sheets 32, three in this case, in order to allow an image to be transferred to such sheets 32.

In FIG. 4, a fourth embodiment is shown to comprise a note pad 40 having a plurality of sheets 42, each of which has an underside with a top strip 44 containing a repositionable adhesive. Each underside also is covered with a layer of a carbonless image transfer material contained in a coating of microcapsules 46A while each top side is covered with a layer of a different carbonless image transfer material contained in a resinous or clay coating 46B. A separate cardboard divider 48 is placed after a selected number of sheets 42, only two in this case, in order to allow an image to be transferred to the sheets 42.

Figure 5:
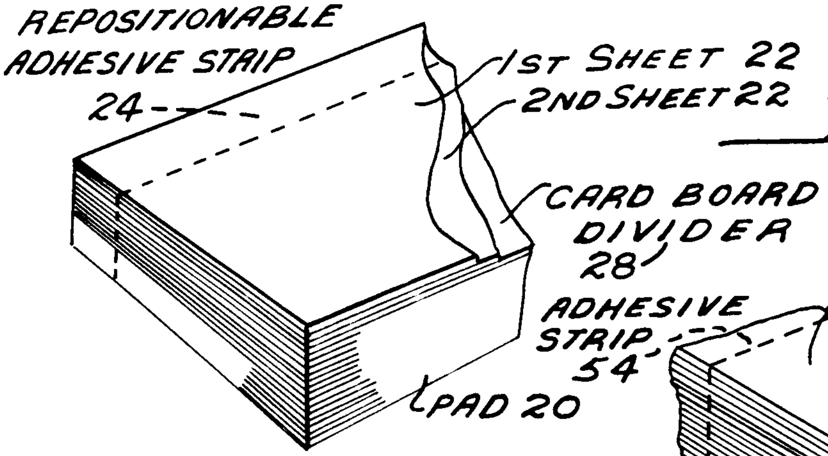
FIG. 5 shows a fragmentary perspective view of the note pad of the second embodiment shown in FIG. 2.

In FIG. 5, a fragmentary perspective view of the note pad 20 of the second embodiment shown in FIG. 2 is illustrated and marked with labels identifying the various parts which comprise the pad 40, i.e., a plurality of sheets 22 and an integral cardboard divider 28 placed after a preselected number of sheets 22. The undersides of the sheets 22 and the periodically arranged dividers 28 have a top strip 24 containing a coating of a repositionable adhesive.

Figure 6:
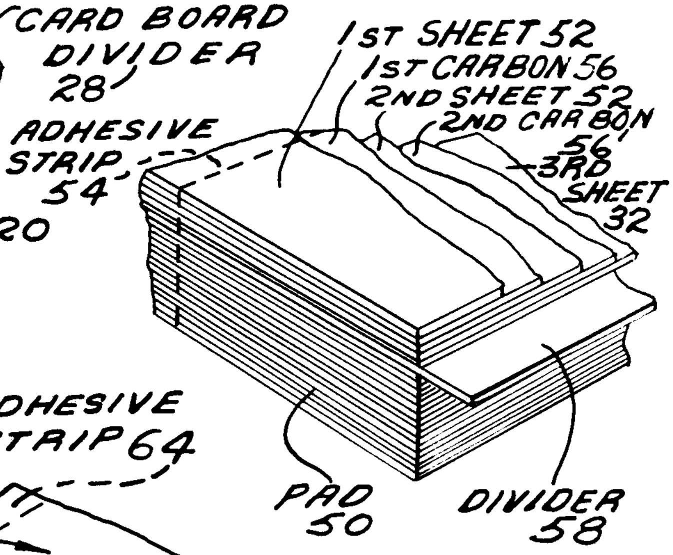
FIG. 6 shows a fragmentary perspective view of a fifth embodiment.
Figure 7:
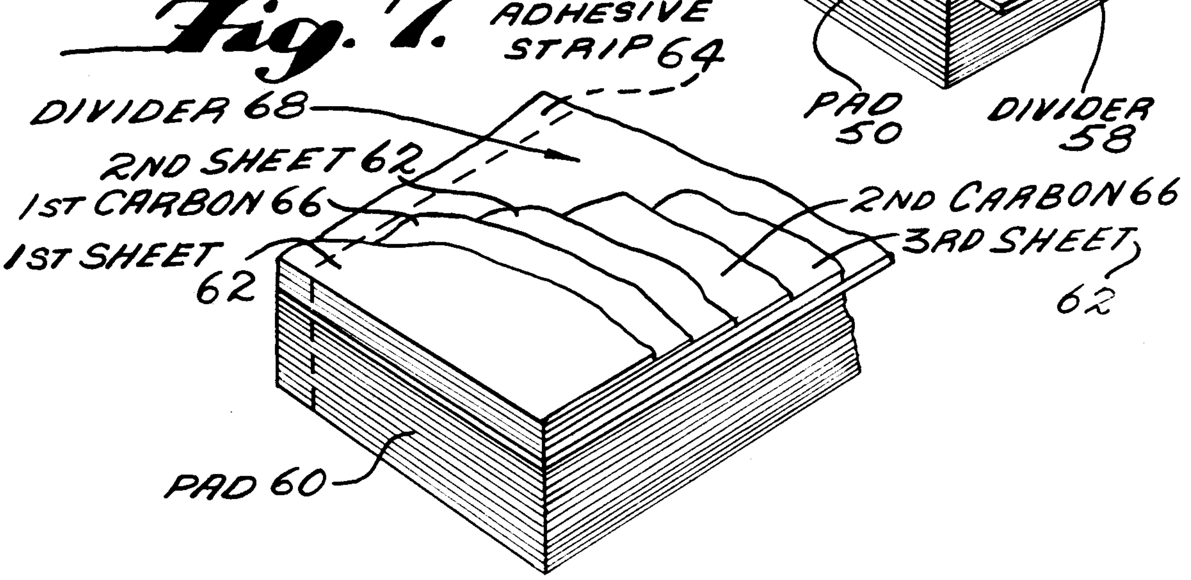
FIG. 7 shows a fragmentary perspective view of a sixth embodiment.

In the two embodiments shown in FIGS. 6 and 7, the image transferring system is shown to be a plurality of interleaved carbon copy papers.

In FIG. 6, a fifth embodiment of the present invention is shown to comprise a note pad 50 having a plurality of sheets 52 and a plurality of interleaved carbons 56. Each of the sheets 52 and carbons 56 has an underside with a top strip 54 containing a repositionable adhesive. A separate cardboard divider 58 is placed after a selected number of sheets 52, three in this case, for transferring an original writing made on a first top sheet 52 to all underlying sheets, in this case two, via the interleaved carbons 56. The divider 58 blocks the original writing on the first top sheet 52 from being transferred to any sheets underneath the divider 58.

In FIG. 7, a sixth embodiment is shown to comprise a note pad 60 having a plurality of sheets 62 and a plurality of interleaved carbons 66. An integral cardboard divider 68 is placed after a selected number of sheets 62, again three in this case. Each of the sheets 62, carbons 66, and intermittent dividiers 68 has an underside with a top strip 64 containing a coating of a repositionable adhesive. Again, the divider 68 blocks any original writing on the first top sheet 62 from being transferred to the sheets underneath the divider 58.

The foregoing preferred embodiments are considered illustrative only. Numerous other modifications and changes will readily occur to those persons skilled in the paper manifolding art after reading this disclosure. Consequently, the disclosed invention is not limited to the exact construction shown and described hereinabove but rather is intended to be encompassed within the scope of the following claims.

I claim:

1. A multiple copy pad comprising:

a plurality of sheets arranged in a stack for receiving a writing;

an image transfer system arranged between each of the plurality of sheets for transferring a writing on one of said sheets to another of said sheets; and a divider means, inserted underneath a selected number of said plurality of sheets, for blocking transfer of an image to a remaining number of said plurality of sheets thereunder;

wherein at least each of said plurality of sheets has a side with a repositionable adhesive strip means for maintaining the stack together.

2. The pad according to claim 1 wherein:

said divider means includes a plurality of nonimage-transferring sheets integrally arranged at preselected intervals within said plurality of sheets.

3. The pad according to claim 2 wherein:

each of said divider means also has a side with a repositionable adhesive strip means for aiding in maintaining the stack together.

4. The pad according to claim 3 wherein:

said side of each of the plurality of sheets and said side of each of the divider means with the repositionable adhesive strip means are undersides thereof.

5. The pad according to claim 1 wherein:

said image transfer system is a plurality of microcapsules containing a carbonless coating applied to a side of each of the plurality of sheets.

6. The pad according to claim 5 wherein:

said side to which the carbonless coating is applied is an underside of each of the plurality of sheets.

7. The pad according to claim 1 wherein:

said image transfer system is one of a resinous coating or a clay coating applied to a side of each of the plurality of sheets.

8. The pad according to claim 7 wherein:

said side to which said one of the resinous coating or the clay coating is applied to a top side of each of the plurality of sheets.

9. The pad according to claim 1 wherein:

said image transfer system is a self-containing mixed coating of microcapsules containing a carbonless image transfer material and a selected one of a resin or a clay, said coating being applied to a side of each of the plurality of sheets.

10. The pad according to claim 9 wherein:

said side to which the mixed coating is applied is a top side of each of the plurality of sheets.

11. The pad according to claim 1 wherein:

said image transfer system includes a plurality of microcapsules containing a carbonless coating applied to one side of each of the plurality of sheets and also includes a selected one of a resinous coating or a clay coating applied to an opposite side of each of the plurality of sheets.

12. The pad according to claim 1 wherein:

said image transfer system is a plurality of carbons interleaved between the plurality of sheets.

13. The pad according to claim 12 wherein:

each of said plurality of carbons also has a side with a repositionable adhesive strip means for aiding in maintaining the stack together.

14. The pad according to claim 12 wherein:

said divider means includes a plurality of nonimage-transferring sheets integrally arranged at preselected intervals within said plurality of sheets.

15. The pad according to claim 14 wherein:

each of said plurality of carbons and said plurality of nonimage-transferring sheets also has a side with a repositionable adhesive strip means for aiding in maintaining the stack together.

16. A multiple-copy pad comprising:

at least two sets of writing sheets alternated with a divider in a stacked formation, each set of writing sheets having a least two writing sheets therein;

repositionable adhesive strip means associated with each of said writing sheets and said divider for maintaining said sheets and divider together in the stacked formation; and image transfer means responsive to an image impression on one sheet of a writing sheet set for transferring the image to the succesive underlying sheets in the writing sheet set, said divider blocking image transfer from a writing sheet of one set to a writing sheet of another set.

17. The multiple-copy pad according to claim 16 wherein said image transfer means comprises a plurality of microcapsules containing a carbonless coating applied to a side of the writing sheet for transferring the image to the next underlying sheet in the writing sheet set.

18. The multiple-copy pad according to claim 17 wherein:

said side to which the carbonless coating is applied is an underside of the writing sheet.

19. The multiple-copy pad according to claim 16 wherein:

said image transfer means comprises a selected one of a resinous coating or a clay coating applied to a side of the writing sheet for transferring the image to another of the writing sheets in the writing sheet set

* * * * *